United States Patent [19]

Modic

[11] Patent Number: 6,057,401
[45] Date of Patent: May 2, 2000

[54] POLYPHENYLENE ETHER/POLYSTYRENE BLENDS WITH IMPROVED PROCESSABILITY

[75] Inventor: Michael John Modic, Houston, Tex.

[73] Assignee: Shell Oil Company, Houston, Tex.

[21] Appl. No.: 09/056,923

[22] Filed: Apr. 8, 1998

Related U.S. Application Data

[60] Provisional application No. 60/043,416, Apr. 9, 1997.

[51] Int. Cl.[7] .............................. C08L 25/06; C08L 71/12

[52] U.S. Cl. .......................................... 525/92 D; 525/98

[58] Field of Search ............................................. 525/92 D

[56] References Cited

U.S. PATENT DOCUMENTS

| | | | |
|---|---|---|---|
| 4,166,055 | 8/1979 | Lee | 525/92 D |
| 4,892,904 | 1/1990 | Ting | 525/92 D |
| 5,272,236 | 12/1993 | Lai | 526/348.5 |

*Primary Examiner*—Patricia A. Short
*Attorney, Agent, or Firm*—Beverlee G. Steinberg

[57] ABSTRACT

There is provided a polymeric composition comprising a polyphenylene ether/polystyrene blend and a modifier comprising hydrogenated elastomeric block copolymer having at least two resinous endblocks of polymerized monovinyl aromatic compound and an elastomeric midblock of polymerized conjugated diene, and a polyolefin having a density of less than 0.92 g/cc. The polymeric composition has excellent processability.

10 Claims, No Drawings

POLYPHENYLENE ETHER/POLYSTYRENE BLENDS WITH IMPROVED PROCESSABILITY

This application claims the benefit of U.S. Provisional Application Ser. No. 60/043,416, filed Apr. 9, 1997, the entire disclosure of which is hereby incorporated by reference.

BACKGROUND OF THE INVENTION

Polyphenylene ether/polystyrene (PPE/PS) blends are attractive for uses requiring strength. However, unmodified PPE/PS blends have poor impact resistance. The most promising impact modifier for PPE/PS blends has been a high molecular weight styrenic block copolymer. However, the high molecular weight of the copolymer modifier leads to PPE/PS blends with reduced melt flow and, thus, reduced processability. Therefore, a modifier which can improve impact resistance of PPE/PS blends and which maintains good melt flow would be highly desirable.

SUMMARY OF THE INVENTION

It has now been discovered that blending a hydrogenated block copolymer comprising at least two polymeric block containing predominately monoalkenyl aromatic hydrocarbon monomer units and at least one block containing a predominately hydrogenated, conjugated diene unit, and an a polyolefin with a density less than 0.92 g/cc with PPE/PS provides toughened blends with improved flow performance. It is therefore an object of this invention to provide a modified PPE/PS blend with excellent toughness and improved processability.

In accordance with the present invention, there is provided a polymeric composition a polyphenylene ether/polystyrene blend and a modifier. The modifier comprises a triblock hydrogenated elastomeric block copolymer having at least two resinous endblocks of polymerized monovinyl aromatic compound and an elastomeric midblock of polymerized conjugated diene, and a polyolefin having a density of less than 0.92 g/cc.

DETAILED DESCRIPTION

It has surprisingly been found that a modifier which is a combination of a high molecular weight triblock styrenic block copolymer and a polyolefin having a density of less than 0.92 g/cc can be used to produce toughened PPE/PS blends with improved flow performance compared to those blends modified with only with the styrenic block copolymer alone.

Polyphenylene ethers (PPE) resins used in this invention are commercially available and are produced by techniques well known in the art, such as by oxidizing a phenol with an oxygen-containing gas in the presence of a catalyst system comprising a cuprous salt and a tertiary amine. Suitable PPE resins are homo- and copolymers with repeating units of the formula

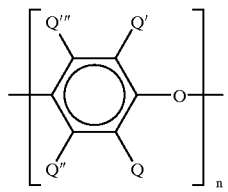

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus. In addition, Q', Q" and Q''' may be halogen with the proviso that if Q', Q" or Q''' are halogen Q and Q' are preferably free of tertiary carbon atoms. The total number of monomer residues is represented by n, which is an integer of at least 50. An especially preferred PPE resin is poly(2,6-dimethyl-1,4-phenylene)ether.

The polystyrene resin used may be prepared from styrene itself, or from any of the analogs or homologs thereof which are suitable for use in styrene polymerization. Examples include alpha-methylstyrene, para-methylstyrene, 2,4-dimethylstyrene, chlorostyrene, dichlorostyrene, bromostyrene, dibromostyrene, para-tert-butylstyrene and para-ethylstyrene.

Any of the rubbers known to be useful in the formulations of rubber modified, high impact polystyrene (HIPS) may be used, including polybutadiene, polyisoprene, ethylene-propylene copolymers (EPR), ethylene-propylenediene (EPDM) rubber and styrene-butadiene copolymers (SBR). Preferred characteristics of the impact polystyrene (or HIPS) include a rubber content of 5 to 20% w. Preferably, the rubber modifier is comprised of a particulate rubbery modifier in which the average size of the particles is in the range of from 0.5 to 4.0 microns in diameter.

The relative ratios of PPE and polystyrene in the composition can vary widely. Typically, the weight ratio of PPE to polystyrene will vary within the range from about 95:5 to about 5:95. Preferably, the polyphenylene ether/polystyrene is blended at a weight ratio range of about 75:25 to 25:75.

The copolymer of the invention is a triblock hydrogenated elastomeric block copolymer having at least two resinous endblocks of polymerized monovinyl aromatic compound and an elastomeric midblock of polymerized conjugated diene. Such elastomeric block copolymers are known in the art, as disclosed for instance in Stevens et al. U.S. Pat. No. 5,194,530 (Mar. 16, 1993), the disclosure of which is hereby incorporated by reference. The copolymers may be linear, A-B-A, or radial. It is also possible to use a mixture of block copolymers, such as a combination of a high molecular weight copolymer and a medium molecular weight copolymer.

Suitable monovinyl aromatic compounds are those having 8 to 20 carbon atoms as exemplified by styrene and styrene homologs such as alpha-methylstyrene and para-methylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1-3-pentadiene (piperylene), 1,3-octadiene, and 2-methyl-1,3- pentadiene. Preferred conjugated dienes are butadiene and isoprene, most preferably butadiene.

The molecular weight of the copolymer will generally be at least 50,000. For linear A-B-A polymers, the molecular weight will generally be within the range of 50,000 to 500,000. Actually, the upper limit is dictated by viscosity considerations and can be as high as can be tolerated and still be processable. The most preferred molecular weight for linear A-B-A copolymers is 60,000 to 250,000. With radial polymers, the molecular weight can be much higher since these polymers have a lower viscosity for a given total molecular weight. Thus, for radial polymers the molecular weight generally will be in the range of 50,000 to 1 million, preferably 100,000 to 500,000.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:
1. Modern Size-Exclusion Liquid Chromatography, W. W. Yau, J. J. Kirkland, D. D. Bly, John Wiley & Sons, New York, NY, 1979.
2. Light Scattering from Polymer Solution, M. B. Huglin, ed., Academic Press, New York, NY, 1972.
3. W. Kaye and A. J. Havlik, Applied Optics, 12, 541 (1973).
4. M. L. McConnell, American Laboratory, 63, May, 1978.

The elastomeric block copolymers utilized in this invention are hydrogenated to such a degree that the unsaturation of the elastomeric block is greatly reduced without significant change in unsaturation of the resinous block component. Generally, at least 90 percent of the unsaturation in the diene midblock is hydrogenated and no more than 25 percent, preferably less than 10 percent, of the aromatic unsaturation is hydrogenated. Such hydrogenation techniques are known in the art and disclosed, for instance, in Jones Reissue 27,145 (Jun. 22, 1971), the disclosure of which is hereby incorporated by reference. Since the block copolymers utilized in this invention are hydrogenated to remove the aliphatic unsaturation, they can be viewed as S-EB-S polymers, where the S refers to the monovinyl aromatic, generally styrene, endblocks and the EB represents ethylenelbutylene, which is the structure resulting from the hydrogenation of polymerized 1,3-butadiene.

Any polyolefin having a density less than 0.92 g/cc and a melt flow index of no more than 10 g/10 min would be useful as a component of the polymer composition. ATTANE® 4601 (Dow Chemical), having a density of 0.912 g/cc, a melt flow index of 1.0 g/10 min, is a polyolefin which has worked well as a component of the PPE/PS modifier. The preferred polyolefin is catalyzed with metallocene, such as a metallocene-based ethylene-alpha olefin. EXACT® 3025 Exxon), having a density of 0.91 g/cc and a melt flow index of 1.2 g/10 min, and EXACT® 4033 Exxon), having a density of 0.88 g/cc and a melt flow index of 0.8 g/10 min, are examples of such a metallocene-based polyolefin. A metallocene-based ethylene-alpha olefin having a density of less than 0.88 g/cc and a melt flow of 1–10 g/10 min will produce a softer polymer product. Examples of such a lower density polyolefins include ENGAGE® 8100 (DuPont-Dow), having a density of 0.87 g/cc and a melt flow index of 1.0 g/10 min and ENGAGE(8200 (DuPont-Dow), having a density of 0.87 g/cc and a melt flow index of 5.0 g/10 min.

In general, the triblock hydrogenated block copolymer and the polyolefin are combined at a weight ratio in the range of 99:1 to 40:60, preferably 75:25 to 40:60, most preferably 50:50. The polymeric composition comprises about 80 to 90% w polyphenylene ether/polystyrene blend and about 20 to 10% w modifier, based upon the total weight of the polymeric composition. Preferably the modifier comprises about 12% w of the total weight of the polymeric composition.

Any of the techniques known in the art for blending polymeric components may be used to combine the components of the polymeric composition of this invention. Suitable blending techniques include solid state physical admixture, molten state admixture, extrusion admixture, roll milling, screw extrusion, and the like. A preferred blending technique is twin-screw extrusion with a high level of shear induced mixing. In general, molten phase admixture will be accomplished at temperatures within the range from about 230° C. to about 310° C. but higher and lower temperatures may, in some cases at least, be operable.

The polymer compositions of this invention may be used in any of the applications for which toughened polyphenylene ether/polystyrene blends are known to be useful. Such uses include the production of molded objects, mechanical goods and extruded materials. The polymeric compositions of this invention may be used in injection molding operations, blow molding operations, compression molding operations and the like. The polymeric compositions of this invention may also be extruded or co-extruded. Due to the excellent impact strength and processability seen by the materials of the invention, the polymer compositions can be used to make instrument panels, machine housings, and miscellaneous parts requiring toughness, such as automotive parts.

Depending upon the particular application or end use in which the compositions of this invention are to be used, the same may be compounded with other components known in the art including synthetic and natural reinforcing fillers such as carbon black, asbestos, fibers and the like; pigments such at titanium dioxide, iron blue, cadmium pigments, chrome yellow, molybdate orange, ultramarine blue, molybdate red, zinc chromate, ultramarine green, various acid dyes, basic dyes, anthraquinones, Red Lake C, Red 23, benzidine yellow, benzidine orange, carbon blacks and the like; various plasticizers; antiblocking agents; antioxidants, such as hindered phenol; lubricants; flame retardants and the like. In general, these materials, when used, will be used at effective concentrations well known in the prior art. Moreover, these materials may be added to the polymeric composition using techniques well known in the prior art.

EXAMPLES

Blends of polyphenylene ether/polystyrene/modifier were prepared in ratios of 44% w polyphenylene ether:44% w polystrene:12% w modifier. The matrix polymers used were PPO® 646 (GE Plastics) and PS 210 (Huntsman Chemical). The properties of the polyolefin modifiers are given in Table 1.

All of the blend components were dry tumble-blended together prior to addition to the feed throat of the extruder. Each blend was prepared on a 25 mm Berstoff co-rotating fully intermeshing twin screw extruder with a two mixing sections. The melt temperature for the blends was approximately 290° C. and the screw speed was 300 rpm. To each blend was added 0.1% w Irganox 1010 as an antioxidant (tetrakis-[methylene-(3,5-di-t-butyl-4-hydroxycinnamate)] methane, by Ciba Geigy). The pellets were molded into test specimens on a 25 ton Arburg injection molding machine for physical property measurements.

Test specimens of the blends were evaluated for room temperature and −40° C. Izod notched toughness per ASTM D256, flexural modulus per ASTM D790, and melt flow at 250° C./10 kg per ASTM D1238. Certain blends were also evaluated for the heat distortion temperature at 66 psi per ASTM D648. The results of the tests are shown in Table 2.

TABLE 1

Polyolefin Density and Melt Flow Index

| Polyolefin | Density (g/cc) | Melt Flow Index at 190° C./5 kg (g/10 min) |
| --- | --- | --- |
| PO-1 | 0.912 | 1.0 |
| PO-2a | 0.91 | 1.2 |
| PO-2b | 0.887 | 2.2 |
| PO-2c | 0.882 | 35.0 |
| PO-2d | 0.88 | 0.8 |
| PO-2e | 0.873 | 4.5 |
| PO-2f | 0.87 | 5.0 |
| PO-2g | 0.87 | 1.0 |
| PO-2h | 0.865 | 20.0 | wherein: PO-1 = polyethylene (ATTANE ® 4601 - Dow Chemical) PO-2 = metallocene-based ethylene copolymer (EXACT ® 3025, 4011, 4023, 4033, 4049 or 5009 (Exxon) or ENGAGE ® 8100, 8200 (DuPont-Dow))

TABLE 2

Toughness and Melt Flow Index of Blends

| Blend # | Modifier (SBC/PO) | SBC/PO Ratio | Notched Izod at Ambient (ft-lb/in) | Notched Izod at −40° C. (ft-lb/in) | Flexural Modulus (1000 psi) | Melt Flow at 250° C./10 kg (g/10 min) | HDT at 66 psi (° C.) |
| --- | --- | --- | --- | --- | --- | --- | --- |
| MG-857 | SBC-1 | 100/0 | 6.6 D | 2.0 B | 345 | 9.04 | 123 |
| MG-913 | SBC-1/PO-1 | 75/25 | 6.3 D | 1.7 B | 334 | 9.6 | |
| MG-917 | SBC-1/PO-1 | 50/50 | 4.4 D | 1.2 B | 356 | 11.3 | |
| MG-918 | SBC-1/PO-2a | 50/50 | 3.2 B | | 355 | 10.7 | |
| MG-919 | SBC-1/PO-2b | 50/50 | 4.9 D | 1.15 B | 361 | 11 | |
| MG-920 | SBC-1/PO-2c | 50/50 | 1.5 B | | 373 | 14.7 | |
| MG-921 | SBC-1/Po-2d | 50/50 | 3.3 B | | 351 | 11.2 | |
| MG-869 | SBC-1/PO-2e | 75/25 | 6.7 D | 2.1 B | 397 | 9.8 | 126 |
| MG-870 | SBC-1/PO-2e | 50/50 | 5.5 D | 1.6 B | 348 | 12.3 | 127 |
| MG-912 | SBC-1/PO-2f | 75/25 | 6.7 D | 1.7 B | 351 | 9.8 | |
| MG-916 | SBC-1/PO-2f | 50/50 | 4.3 D | | 358 | 12.8 | |
| MG-911 | SBC-1/PO-2g | 75/25 | 6.1 D | | 350 | 9.4 | |
| MG-915 | SBC-1/PO-2g | 50/50 | 4.6 D | | 353 | 11.9 | |
| MG-910 | SBC-1/PO-2h | 75/25 | 6.1 D | 1.8 B | 358 | 10.4 | |
| MG-914 | SBC-1/PO-2h | 50/50 | 2.1 B | | 348 | 14.1 | |
| MG-866 | SBC-2 | 100/0 | 0.65 B | | 338 | 18.3 | |

TABLE 2-continued

Toughness and Melt Flow Index of Blends

| Blend # | Modifier (SBC/PO) | SBC/PO Ratio | Notched Izod at Ambient (ft-lb/in) | Notched Izod at −40° C. (ft-lb/in) | Flexural Modulus (1000 psi) | Melt Flow at 250° C./10 kg (g/10 min) | HDT at 66 psi (° C.) |
|---|---|---|---|---|---|---|---|
| MG-867 | SBC-2/PO-2e | 75/25 | 0.80 B | | 380 | 19.5 | |
| MG-868 | SBC-2/PO-2e | 50/50 | 0.80 B | | 391 | 18.1 | | wherein:
HDT = Heat Distortion Temperature
SBC-1 = S—EB—S triblock copolymer with a molecular weight of approximately 181,000
SBC-2 = S—EP diblock copolymer with a molecular weight of approximately 123,000
D = ductile failure
B = brittle failure It can be seen that using a modifier containing a triblock styrenic block copolymer and a polyolefin having a density of less than 0.92 g/cc and a melt flow index less than 10 g/10 min results in a composition that displays good room temperature notch toughness with ductile failure mode. It can further be seen that replacing about 50% w of the triblock copolymer with a metallocene-based polyolefin improves processability over blends modified with the triblock copolymer alone. Particularly good impact results and processability parameters are seen when a metallocene-based polyolefin having a density of less than 0.88 g/cc and a melt flow index between the range of about t and about 10 g/10 min is used. Use of a polyolefin with a high melt flow index (Blends MG-910 and MG-914) results in a blend with good processability but at the sacrifice of impact strength.

While the present invention has been described and illustrated by reference to particular embodiments thereof, it will be appreciated by those of ordinary skill in the art that the same may lend itself to variations not necessarily described or illustrated herein. For this reason then, reference should be made solely to the appended claims for purposes of determining the true scope of the invention.

What is claimed is:

1. A polymeric composition comprising:

80 to 90 weight percent of a polyphenylene ether/polystyrene blend, wherein the blend comprises a polyphenylene ether/polystyrene weight ratio in the range of from about 75:25 to about 25:75; and 20 to 10 weight percent of a modifier comprising a hydrogenated elastomeric block copolymer having at least two resinous endblocks of polymerized monovinyl aromatic compound and an elastomeric midblock of polymerized conjugated diene, said block copolymer having a molecular weight of at least 60,000, and an elastic metallocene-based ethylene copolymer having a density of less than 0.88 g/cc and a melt index of 4.5–5.0 g/10 min measured at 190° C./5 kg, wherein the weight ratio of the elastomeric block copolymer to the ethylene copolymer is from about 75:25 to about 40:60.

2. The composition according to claim 1, wherein the polyphenylene ether/polystyrene blend comprises a polyphenylene ether/polystyrene weight ratio of about 1:1.

3. The composition according to claim 2, wherein the weight ratio of said elastomeric block copolymer to the ethylene copolymer is about 75:25.

4. The composition according to claim 1, wherein said resinous endblocks comprise polymerized styrene and said elastomeric midblock is selected from polymerized 1,3-butadiene and polymerized isoprene.

5. The composition according to claim 4, wherein said elastomeric midblock is polymerized 1,3-butadiene.

6. A process for improving the processability of a polyphenylene ether/polystyrene blend, said process comprising blending:

80 to 90 weight percent of a polyphenylene ether/polystyrene blend, wherein the blend comprises a polyphenylene ether/polystyrene weight ratio in the range of from about 75:25 to about 25:75; and 20 to 10 weight percent of a modifier comprising a hydrogenated elastomeric block copolymer having at least two resinous endblocks of polymerized monovinyl aromatic compound and an elastomeric midblock of polymerized conjugated diene, said block copolymer having a molecular weight of at least 60,000, and an elastic metallocene-based ethylene copolymer having a density of less than 0.88 g/cc and a melt index of 4.5–5.0 g/10 min measured at at 190° C./5 kg, wherein the weight ratio of the elastomeric block copolymer to the ethylene copolymer is from about 75:25 to about 40:60.

7. The process according to claim 6, wherein said resinous endblocks comprise polymerized styrene and said elastomeric midblock is selected from polymerized 1,3-butadiene and polymerized isoprene.

8. The process according to claim 6, wherein the weight ratio of said elastomeric block copolymer to said ethylene copolymer is about 75:25.

9. The process according to claim 6, wherein said polyphenylene ether/polystyrene blend is present in a concentration of about 88 parts by weight and said modifier is present in a concentration of about 12 parts by weight.

10. The process according to claim 6, wherein said elastomeric midblock is polymerized 1,3-butadiene.

* * * * *